(12) United States Patent
Ohwatari et al.

(10) Patent No.: US 8,224,369 B2
(45) Date of Patent: Jul. 17, 2012

(54) RADIO COMMUNICATION APPARATUS AND RADIO COMMUNICATION METHOD

(75) Inventors: Yusuke Ohwatari, Yokohama (JP);
 Anass Benjebbour, Yokosuka (JP);
 Tomoyuki Ooya, Yokohama (JP);
 Junichiro Hagiwara, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 322 days.

(21) Appl. No.: 12/432,230

(22) Filed: Apr. 29, 2009

(65) Prior Publication Data
 US 2009/0280856 A1 Nov. 12, 2009

(30) Foreign Application Priority Data
 May 12, 2008 (JP) .................................. 2008-125341

(51) Int. Cl.
 *H04B 7/00* (2006.01)
(52) U.S. Cl. ...................... 455/522; 455/452.1; 455/509
(58) Field of Classification Search .................. 455/522, 455/450, 452.1, 509, 515
 See application file for complete search history.

(56) References Cited

U.S. PATENT DOCUMENTS

| | | | | |
|---|---|---|---|---|
| 7,689,240 | B2* | 3/2010 | Anderson | 455/522 |
| 7,760,751 | B2* | 7/2010 | Hosein | 370/437 |
| 7,881,739 | B2* | 2/2011 | Sarkar et al. | 455/522 |
| 2007/0270173 | A1* | 11/2007 | Niu et al. | 455/522 |
| 2010/0142461 | A1* | 6/2010 | Miki et al. | 370/329 |
| 2010/0279729 | A1* | 11/2010 | Hui et al. | 455/522 |
| 2011/0002410 | A1* | 1/2011 | Forenza et al. | 375/267 |
| 2011/0002414 | A1* | 1/2011 | Coldrey et al. | 375/296 |

OTHER PUBLICATIONS

G. J. Foschini, et al, "Coordinating Multiple Antenna Cellular Networks to Achieve Enormous Spectral Efficiency", MIMO Wireless and Mobile Communications, IEE Proceedings Communications, vol. 153, No. 4, Aug. 2006, pp. 548-555.
Shenfa Liu, et al., "Multi-Level Zero-Forcing Method for Multiuser Downlink System with Per-antenna Power Constraint", VTC2007-Spring Apr. 2007, pp. 2248-2252.
Wei Yu, et al., "Transmitter Optimization for the Multi-Antenna Downlink with Per-Antenna Power Constraints", IEEE Transactions on Signal Processing, vol. 55, No. 6, Jun. 2007, pp. 2646-2660.
European Office Action mailed on Feb. 3, 2012 in corresponding European patent application No. 09251189.8.
Federico Boccardi, et al., "Zero-Forcing Precoding for the Mimo Broadcast Channel Under Per-Antenna Power Constraints," 5 pages, Jul. 2006.

(Continued)

*Primary Examiner* — James H Cho
(74) *Attorney, Agent, or Firm* — Oblon, Spivak, McClelland, Maier & Neustadt, L.L.P.

(57) ABSTRACT

A disclosed radio communication apparatus includes a precoding unit, a optimum transmit power calculation unit and a transmission unit. The optimum transmit power calculation unit receives the transmit weight related information from the precoding unit and calculates a transmit power level to optimize an objective function in accordance with an interior point method. The objective function results from addition of a barrier function adjusted with a barrier parameter to an original objective function associated with a constrained optimization problem. The original objective function includes a function of respective channel capacities for individual users derived from the transmit weight related information. The optimum transmit power calculation unit adaptively updates a logarithm of the barrier parameter and uses a gradient obtained through a high-order derivative with the logarithm of the barrier parameter to calculate the transmit power level to optimize the resulting objective function.

20 Claims, 13 Drawing Sheets

OTHER PUBLICATIONS

Thomas P. Caudell, et al., "Neural Network Architecture for Linear Programming," Research and Technology, Boeing Computer Services, P.O. Box 24346, MS 7L-22, Seattle, WA 98124-0346, 6 pages, Jun. 1992.

Shuying Shi, et al., "Per-Antenna Power Constrained Rate Optimization for Multiuser Mimo Systems," pp. 270-277, Feb. 2008.

* cited by examiner

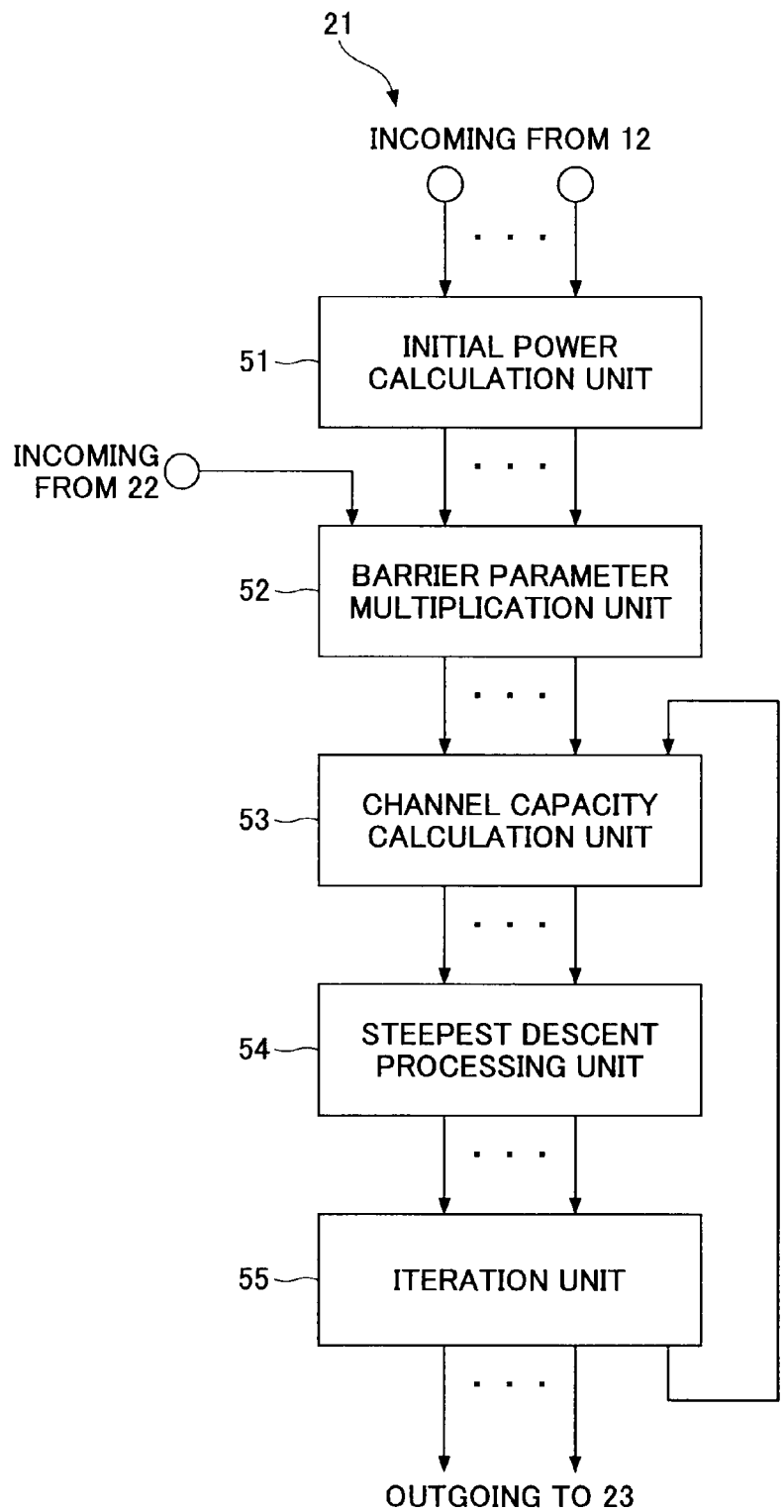

RADIO COMMUNICATION APPARATUS AND RADIO COMMUNICATION METHOD

BACKGROUND OF THE INVENTION

1. Field of the Invention

Embodiments discussed herein are directed to an apparatus and method for radio communication under the condition where some constraints on transmit power levels are applied for each transmit antenna or each group of transmit antennas in multi-user MIMO downlinks.

2. Description of the Related Art

In recent years, a MIMO (Multiple-Input Multiple-Output) transmission scheme has been intensively investigated for improvement of frequency or spectral efficiency and increase in communication capacity. In this MIMO transmission scheme, a multi-user (MU)-MIMO system designed to apply the MIMO transmission scheme to multiple users for further improvement of the spectral efficiency is attracting attention. Furthermore, a system designed for MU-MIMO coordinated base stations transmission is being studied, and it is reported that it can realize significant improvement of throughput.

In this MU-MIMO coordinated base stations transmission system, since different power amplifiers are used for different antennas of base stations or different base stations, respective characteristics of the power amplifiers must be taken into account. Particularly if data streams transmitted from users are precoded based on feedback information such as channel information supplied from the users, the levels of transmit power allocated for the different streams transmitted from the users depending on precoding weights of transmit antennas must be adjusted each time of updating the feedback information such as the channel information because of constraints on transmit power imposed on the base stations.

A first article G. J. Foschini, K. Karakayali and R. A. Valenzuela, "Coordinating multiple antenna cellular networks to achieve enormous spectral efficiency", IEE Proceedings Communications, vol. 153, No. 4, pp. 548-555, August 2006 discloses that block diagonalization zero-forcing, which is a precoding scheme designed for transmission without interference among individual users, is used in a MU-MIMO coordinated base stations transmission system in consideration of respective characteristics of individual power amplifiers to propose and solve a transmit power optimization problem that can realize uniform allocation of channel capacity to individual users. In this article, it is also shown that this approach can significantly improve the channel capacity compared to systems without the coordination among base stations.

A second article S. Liu, N. Hu, Z. He, K. Niu and W. Wu, "Multi-level zero-forcing method for multiuser downlink system with per-antenna power constraint", VTC 2007-Spring, pp. 2248-2252, April 2007 discloses optimization problems for optimizing transmit weights and transmit power for precoding in the above MU-MIMO coordinated base stations transmission system such that the channel capacity of the overall system can be maximized. In this article, it is also shown that this approach can improve the channel capacity.

A third article W. Yu and T. Lan, "Transmitter optimization for the multi-antenna downlink with per-antenna power constraints", IEEE Trans., Signal Processing, pp. 2646-2660, June 2007 discloses an optimization problem using duality of uplink and downlink and a solution method in the above MU-MIMO coordinated base stations transmission system.

The power allocation optimization problems as stated above correspond to constrained nonlinear optimization problems, and higher computational complexity may be required to solve them. For example, in the case where the power allocation optimization problems are solved with use of an interior point method in accordance with a steepest descent method, the solution can be analytically obtained in a relatively simple algorithm, but higher computational complexity may be required for convergence.

The first and second articles, however, have no investigation on reduction in the computational complexity for solving the optimization problems as proposed in the articles.

Also, the third article is directed to only linear precoding and makes no mention of nonlinear precoding.

SUMMARY OF THE INVENTION

Accordingly, it is an object of the present invention to provide radio communication apparatus and method that can calculate an optimum transmit power allocation to individual users while reducing the computational complexity associated with that calculation under the situation where respective transmit power levels are constrained for different transmit antennas and different groups of transmit antennas.

One aspect of the present invention relates to a radio communication apparatus for transmitting a radio signal to multiple users via multiple transmit antenna groups at appropriate transmit power levels, each of the transmit antenna groups including one or more transmit antennas, the transmit antenna groups having respective transmit power constraints, the apparatus comprising: a precoding unit configured to perform precoding on signals modulated for individual users and generate transmit weight related information; an optimum transmit power calculation unit configured to receive the transmit weight related information from the precoding unit and calculate a transmit power level to optimize an objective function in accordance with an interior point method, the objective function resulting from addition of a barrier function adjusted with a barrier parameter to an original objective function associated with a constrained optimization problem; and a transmission unit configured to transmit a radio signal at the calculated transmit power level, wherein the original objective function comprises a function of respective channel capacities for individual users derived from the transmit weight related information, and wherein the optimum transmit power calculation unit is configured to adaptively update a logarithm of the barrier parameter and use a gradient obtained through a high-order derivative with the logarithm of the barrier parameter to calculate the transmit power level to optimize the resulting objective function.

Another aspect of the present invention relates to a radio communication method for transmitting a radio signal to multiple users via multiple transmit antenna groups at appropriate transmit power levels, each of the transmit antenna groups including one or more transmit antennas, the transmit antenna groups having respective transmit power constraints, the method comprising: precoding signals modulated for individual users and generating transmit weight related information; receiving the transmit weight related information from the precoding unit and calculating a transmit power level to optimize an objective function in accordance with an interior point method, the objective function resulting from addition of a barrier function adjusted with a barrier parameter to an original objective function associated with a constrained optimization problem; and transmitting a radio signal at the calculated transmit power level, wherein the original objective function comprises a function of respective channel capacities for individual users derived from the transmit weight related information, and wherein the calculating comprises adaptively updating a logarithm of the barrier parameter and using a gradient obtained through a high-order derivative with the logarithm of the barrier parameter to calculate the transmit power level to optimize the resulting objective function.

According to the aspects of the present invention, optimum transmit power levels can be allocated for individual users while reducing the computational complexity associated with that calculation under the situation where respective transmit power levels are constrained for different transmit antennas and different groups of transmit antennas.

Additional objects and advantages of the invention (embodiment) will be set forth in part in the description which follows, and in part will become obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 5 illustrates an exemplary arrangement of an interior point method processing unit in the optimum transmit power calculation unit in the radio communication apparatus according to the first embodiment;

DETAILED DESCRIPTION OF THE PREFERRED EMBODIMENTS

Figure 1:
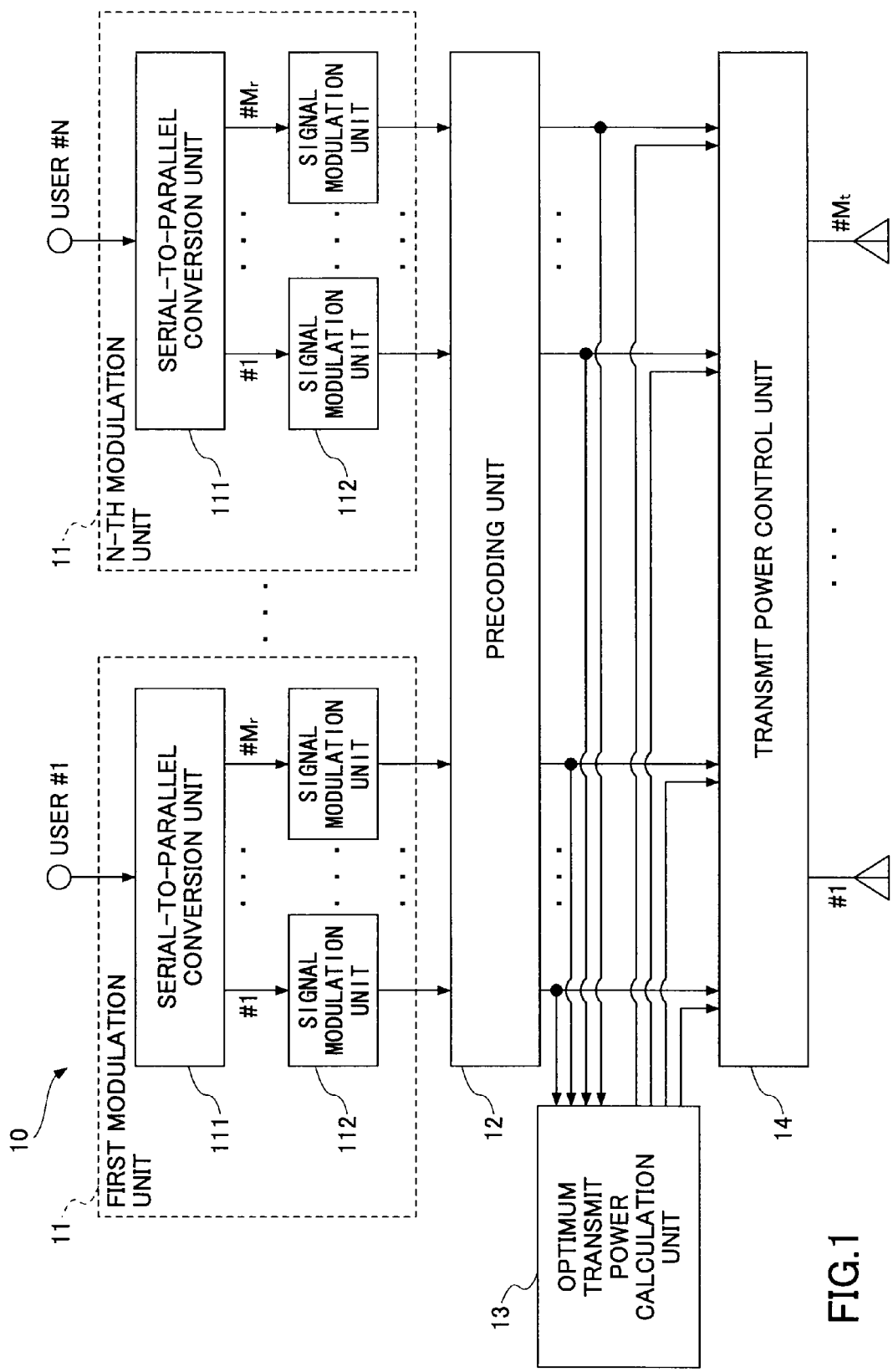
FIG. 1 illustrates an exemplary arrangement of a radio communication apparatus according to a first embodiment.

Embodiments of the present invention are described with reference to the accompanying drawings.

One aspect of the present invention relates to a radio communication apparatus for transmitting a radio signal to multiple users via multiple transmit antenna groups at appropriate transmit power levels, each of the transmit antenna groups including one or more transmit antennas, the transmit antenna groups having respective transmit power constraints, the apparatus including: a precoding unit configured to perform precoding on signals modulated for individual users and generate transmit weight related information; an optimum transmit power calculation unit configured to receive the transmit weight related information from the precoding unit and calculate a transmit power level to optimize an objective function in accordance with an interior point method, the objective function resulting from addition of a barrier function adjusted with a barrier parameter to an original objective function associated with a constrained optimization problem; and a transmission unit configured to transmit a radio signal at the calculated transmit power level, wherein the original objective function comprises a function of respective channel capacities for individual users derived from the transmit weight related information, and wherein the optimum transmit power calculation unit is configured to adaptively update a logarithm of the barrier parameter and use a gradient obtained through a high-order derivative with the logarithm of the barrier parameter to calculate the transmit power level to optimize the resulting objective function.

According to the aspect of the present invention, appropriate barrier parameters r(i) are set for individual step iterations in the interior point method. As a result, optimum transmit power can be allocated for individual users under some constraints on respective transmit power limit values of individual transmit antennas or individual transmit antenna groups while reducing iterations, that is, computational complexity, required for convergence in the interior point method.

In one embodiment, the optimum transmit power calculation unit may use a high-order differential value of the resulting objective function with the logarithm of the barrier parameter as the gradient. In a further embodiment, the optimum transmit power calculation unit may use a high-order differential value of the original objective function with the logarithm of the barrier parameter. In a still further embodiment, the optimum transmit power calculation unit may use a high-order differential value of a monotonically decreasing function of the barrier function with the logarithm of the barrier parameter. According to the embodiments, optimum transmit power can be allocated for individual users under the above constraints while reducing the computational complexity.

In one embodiment, the optimum transmit power calculation unit may use a second-order derivative as the high-order derivative. In a further embodiment, the optimum transmit power calculation unit may use a steepest descent method in the interior point method for constrained optimization. According to the embodiments, optimum solutions can be analytically calculated with a simple algorithm.

In one embodiment, the optimum transmit power calculation unit may terminate step iteration in the steepest descent method if any of conditions is satisfied. The conditions may include a condition of change in values of the resulting objective function derived in accordance with the interior point method with respect to change in transmit power levels being within a predefined threshold, a condition of change in values of the original objective function with respect to an increment of the step iteration being within a predefined threshold, and a condition of the number of step iterations exceeding a predefined threshold. According to the embodiment, determination of convergent points in the steepest descent method can be made, and the optimum solutions can be derived, In one embodiment, the optimum transmit power calculation unit may terminate step iteration in the interior point method if any of conditions is satisfied. The conditions may include a condition of the barrier parameter being smaller than a predefined threshold, and a condition of change in values of an original objective function with respect to an increment of the step iteration being within a predefined threshold. According to the embodiment, determination of convergent points in the interior point method can be made, and the optimum solutions can be derived.

In one embodiment, the optimum transmit power calculation unit may perform the constrained optimization to make respective channel capacities for the users uniform. According to the embodiment, the optimum solutions can be derived to make respective channel capacities of individual users uniform after power allocation.

In one embodiment, the optimum transmit power calculation unit may perform the constrained optimization to maximize channel capacity for an overall system. According to the embodiment, the optimum solutions can be derived to maximize the sum of the respective channel capacities of individual users after power allocation.

The embodiments determine transmit power levels for respective transmit streams for individual users under some constraints of respective transmit power levels for individual transmit antennas or transmit antenna groups and transmits radio signals at the determined transmit power levels.

Some embodiments of the present invention are described with reference to the accompanying drawings.

First Embodiment

FIG. 1 illustrates an exemplary arrangement of a radio communication apparatus 10 according to the first embodiment. As illustrated in FIG. 1, the radio communication apparatus 10 includes a number of modulation units 11 corresponding to the number (N) of users, a precoding unit 12, an optimum transmit power calculation unit 13 and a transmit power control unit 14. Each of the modulation units 11 includes a serial-to-parallel conversion unit 111 and signal modulation units 112.

Figure 2:
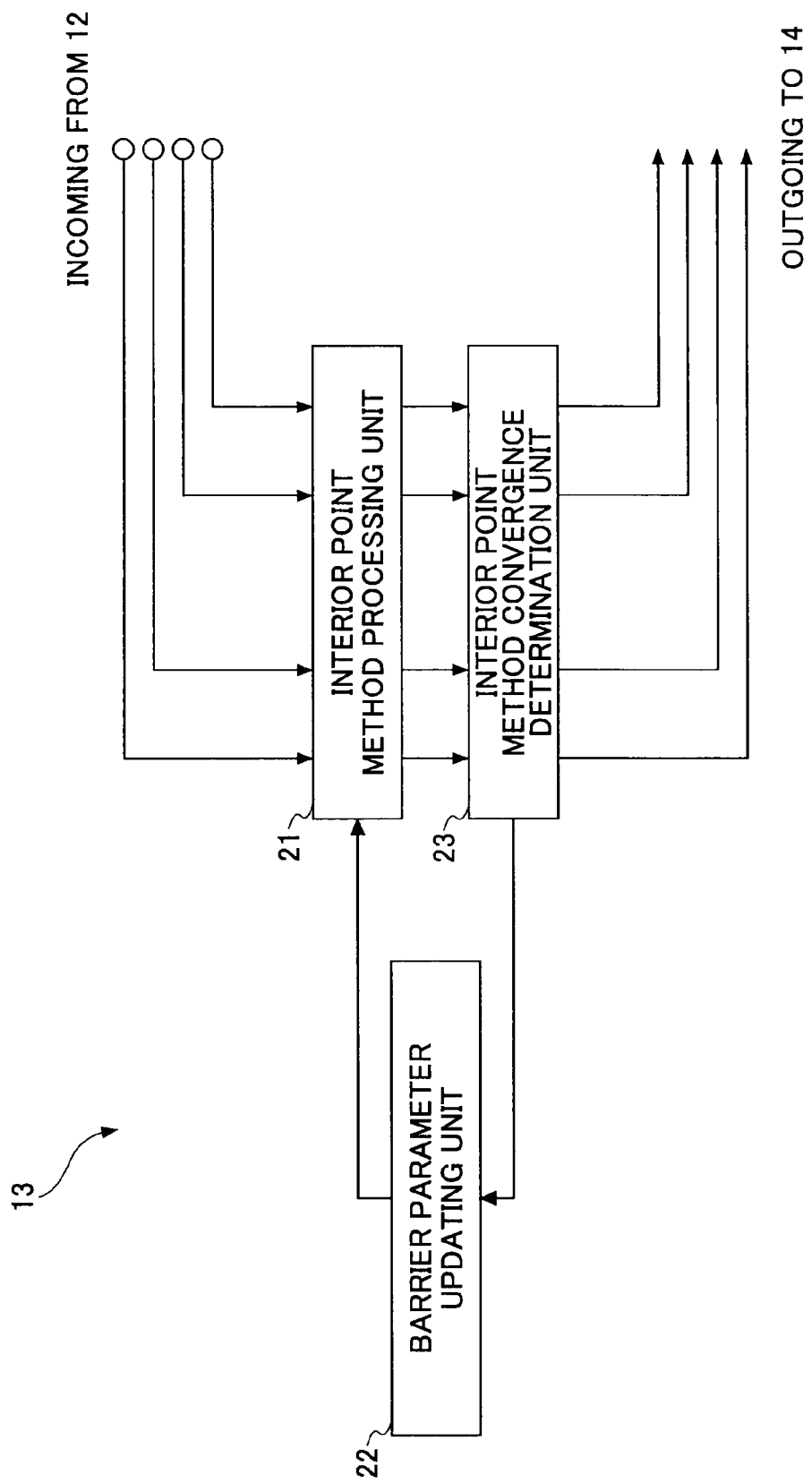
FIG. 2 illustrates an exemplary arrangement of an optimum transmit power calculation unit in the radio communication apparatus according to the first embodiment.

FIG. 2 illustrates an exemplary arrangement of the optimum transmit power calculation unit 13 according to the first embodiment. The optimum transmit power calculation unit 13 includes an interior point method processing unit 21, a barrier parameter updating unit 22 and an interior point method convergence determination unit 23.

Figure 3:
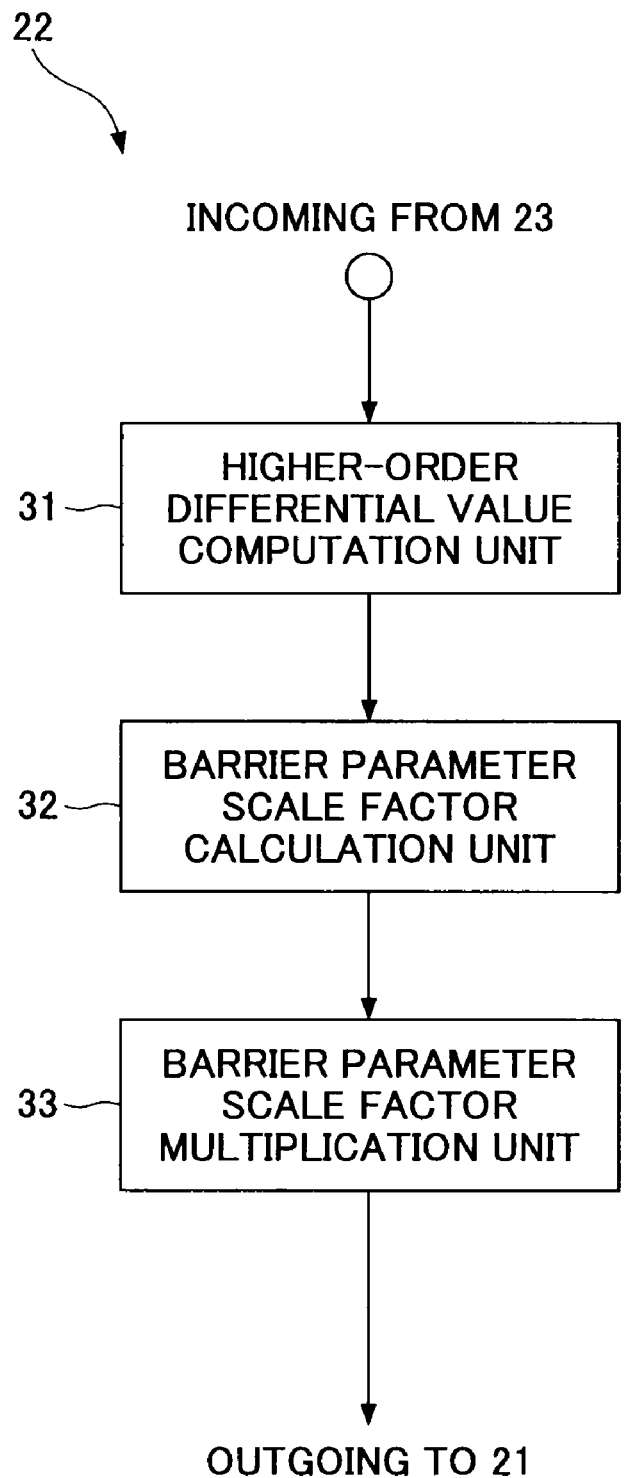
FIG. 3 illustrates an exemplary arrangement of a barrier parameter updating unit in the optimum transmit power calculation unit in the radio communication apparatus according to the first embodiment.

FIG. 3 illustrates an exemplary arrangement of the barrier parameter updating unit 22 according to the first embodiment. The barrier parameter updating unit 22 includes a higher-order differential value calculation unit 31, a barrier parameter scale factor calculation unit 32 and a barrier parameter scale factor multiplication unit 33.

Next, exemplary operations of the above-mentioned radio communication apparatus and an exemplary radio communication method according to the first embodiment are described below. In the following, a channel information based block diagonalization zero-forcing (BD-ZF) is used for precoding in MU-MIMO transmission with use of $M_t$ transmit antennas, N users and $M_r$ user antennas.

In other embodiments, any other channel information based MU-MIMO precoder, such as ZF, MMSE or DPC, may be used for the precoding. Alternatively, another type of precoding of selecting transmit weight vectors from a codebook may be used.

In the modulation unit 11 in FIG. 1, the serial-to-parallel conversion unit 111 assigns an information signal sequence to be transmitted to the associated user to individual transmit streams. The signal modulation units 112 modulate the transmit streams and generate transmit signals $S_{k,j}$ ($1 \leq k \leq N$ and $1 \leq j \leq M_r$). The notation $S_{k,j}$ represents a transmit signal for transmitting the j-th transmit stream for the k-th user. A $M_r$-dimensional transmit signal vector $s_k$ for the k-th user is defined as $$s_k = [s_{k,1}, \ldots, s_{k,j}, \ldots s_{k,M_r}]^T \qquad (1),$$

where the superscript T represents transposition.

Here, letting a channel matrix of $M_r \times M_t$ MIMO channels for the k-th user be $H_k$, a BD-ZF transmit weight matrix $W_{BD\text{-}ZF,k}$ of size $M_t \times M_r$ for the k-th user is generated to satisfy the formula, $$H_k W_{BD\text{-}ZF,m} = 0 (k \neq m) \qquad (2).$$

An equivalent channel matrix $H_k'$ of size $M_r \times M_r$ for the k-th user resulting from application of the BD-ZF is defined as follows and is subjected to singular value decomposition (SVD).

$$H_k' = H_k W_{BD\text{-}ZF,k} = U_k \Lambda_k V_k^H \qquad (3)$$

$$\Lambda_k = \begin{bmatrix} \sqrt{\lambda_{k,1}} & \cdots & 0 \\ \vdots & \ddots & \vdots \\ 0 & \cdots & \sqrt{\lambda_{k,M_r}} \end{bmatrix},$$

where the superscript H represents a Hermitian transpose and $\lambda_{k,j}$ represents an eigenvalue of $H_k'^H H_k'$.

Using $V_k$ obtained from the above equation and the $W_{BD\text{-}ZF,k}$, let a transmit weight matrix of size $M_t \times M_r$ for the k-th user be $W_k$. In other words, $$W_k = W_{BD\text{-}ZF,k} V_k = \begin{bmatrix} w_{k,1,1} & \cdots & w_{k,M_t,1} \\ \vdots & \ddots & \vdots \\ w_{k,1,M_r} & \cdots & w_{k,M_t,M_r} \end{bmatrix}. \qquad (4)$$

The precoding unit 12 derives the matrix $W_k$ and supplies components $W_{k,q,j}$ ($1 \leq q \leq M_t$) and $\lambda_{k,j}$ of the matrix $W_k$ as transmit weight related information to the optimum transmit power calculation unit 13. Also, the precoding unit 12 supplies the matrix $W_k$ and the vector $s_k$ to the transmit power control unit 14.

The transmit power control unit 14 in turn uses the supplied $W_k$ and $s_k$ together with transmit power $P_{k,j}$ assigned to the j-th transmit stream for the k-th user that is derived in the optimum transmit power calculation unit 13 as discussed below to generate an $M_r$-dimensional transmit signal vector $x_k$ after the precoding as follows, and supplies the vector $x_k$ to users, $$x_k = W_k \begin{bmatrix} \sqrt{P_{k,1}} & \cdots & 0 \\ \vdots & \ddots & \vdots \\ 0 & \cdots & \sqrt{P_{k,j}} \end{bmatrix} s_k. \quad (5)$$

Also, letting an $M_r$-dimensional received signal vector for the k-th user be $y_k$ and an $M_r$-dimensional noise vector be $n_k$, the received signal will be represented as follows, $$y_k = H_k x_k + n_k \quad (6).$$

Here, letting a received weight matrix of size $M_r \times M_r$ for the k-th user be $U_k^H$ in the formula (3), multiplication of the received weight matrix $U_k^H$ and the received signal vector $y_k$ is represented as follows, $$\begin{aligned} U_k^H y_k &= U_k^H H_k x_k + U_k^H n_k \quad (7) \\ &= U_k^H H_k W_{BD\text{-}ZF,k} V_k^H P_k s_k + U_k^H n_k \\ &= \Lambda_k P_k s_k + U_k^H n_k \\ &= \begin{bmatrix} \sqrt{\lambda_{k,1}} & \cdots & 0 \\ \vdots & \ddots & \vdots \\ 0 & \cdots & \sqrt{\lambda_{k,M_r}} \end{bmatrix} \\ &\quad \begin{bmatrix} \sqrt{P_{k,1}} & \cdots & 0 \\ \vdots & \ddots & \vdots \\ 0 & \cdots & \sqrt{P_{k,j}} \end{bmatrix} s_k + U_l^H n_k. \end{aligned}$$

Thus, this exhibits that signals that have been spatially multiplexed and transmitted to users can be received without interference. Also, letting the noise power be $\sigma^2$, a reception $SNR_{k,j}$ for the j-th transmit stream for the k-th user is represented as follows, $$SNR_{k,j} = \frac{\lambda_{k,j} P_{k,j}}{\sigma^2}. \quad (8)$$

Using this received $SNR_{k,j}$, a MIMO channel capacity $C_k$ for the k-th user is represented as follows, $$\begin{aligned} C_k &= \sum_{j=1}^{M_r} \log_2(1 + SNR_{k,j}) \quad (9) \\ &= \sum_{j=1}^{M_r} \log_2\left(1 + \frac{\lambda_{k,j} P_{k,j}}{\sigma^2}\right). \end{aligned}$$

Next, exemplary operations of the optimum transmit power calculation unit 13 are described below. The optimum transmit power calculation unit 13 receives the components $w_{k,q,j}$ of the transmit weight matrix $W_k$ and the eigenvalues $\lambda_{k,j}$ as transmit weight related information from the precoding unit 12 and uses them to derive $P_{k,j}$ to satisfy a transmit power limit value $P_{max,q}$ of the q-th transmit antenna. Specifically, this may correspond to solving an optimization problem as follows, $$\text{maximize } \min_k C_k = \min_k \sum_{j=1}^{M_r} \log_2(1 + SNR_{k,j}) \quad (10)$$

$$\text{s.t. } \sum_{k=1}^{N} \sum_{j=1}^{M_r} |w_{k,q,j}|^2 P_{k,j} \leq P_{max,q} \quad (11)$$

$$P_{k,j} \geq 0 \,\forall\, k, j. \quad (12)$$

The formula (10) for the optimization problem means maximization of a minimum user capacity among all users. By solving the optimization problem, the respective channel capacities can be made almost uniform over all the users, which is referred to as Fairness criteria herein.

The optimization problem can be solved based on an interior point method. According to this interior point method, a barrier parameter r(i) for adjusting values of the barrier function $g(P_{k,j})$ is added to the formula (10), and a new optimization problem for maximizing a function without constraints (11) and (12) is solved. Here, the parameter i represents the number of step iterations in the interior point method as discussed in detail below. Specifically, it starts with a greater barrier parameter, and the optimum power $P_{k,j}$ is calculated for each barrier parameter. The calculated value is used as an initial value to iterate the process while decreasing the barrier parameter. Once the barrier parameter r(i) reaches a sufficiently small value, the original constrained optimization problem can be solved. The new optimization problem with use of the barrier function and the barrier parameter can be represented as follows, $$\text{maximize } F = f + r(i) g(P_{k,j}) \quad (13)$$

$$\text{where } f = \min_k C_k. \quad (14)$$

The function f is an exemplary original objective function associated with the constrained optimization problem on channel capacities for users. The function F is an exemplary objective function derived by addition of the barrier function and the barrier parameter for adjusting values of the barrier function to the original objective function and serves as an objective function for the new optimization problem.

In some embodiments, the barrier function $g(P_{k,j})$ may be a function including transmit weights, transmit power limit values and/or transmit power values. For example, the barrier function as presented below may be used, $$g(P_{k,j}) = -\sum_{q=1}^{M_t} \left( P_{max,q} - \sum_{k=1}^{N} \sum_{j=1}^{M_r} |w_{k,q,j}|^2 P_{k,j} \right)^{-1} - \sum_{k=1}^{N} \sum_{j=1}^{M_r} (P_{k,j})^{-1}. \quad (15)$$

In another example, the barrier function $g(P_{k,j})$ as presented below may be used, $$g(P_{k,j}) = \sum_{q=1}^{M_t} \log\left( P_{max,q} - \sum_{k=1}^{N} \sum_{j=1}^{M_r} |w_{k,q,j}|^2 P_{k,j} \right) + \sum_{k=1}^{N} \sum_{j=1}^{M_r} \log(P_{k,j}). \quad (16)$$

Next, exemplary operations of the interior point method processing unit 21, the barrier parameter updating unit 22 and the interior point method convergence determination unit 23 illustrated in FIG. 2 are described in detail. The interior point method processing unit 21 uses the transmit weight components $w_{k,q,j}$ and the eigenvalue $\lambda_{k,j}$ supplied from the optimum transmit power calculation unit 13 to perform optimization on the objective function F, including the barrier function and the barrier parameter as illustrated in the formula (13), for each step iteration i in the interior point method and supplies a transmit power level $P_{k,j}$ derived at the i-th step iteration to the interior point method convergence determination unit 23. The interior point method convergence determination unit 23 determines whether step iteration convergence conditions in the interior point method as presented below are satisfied, $$\begin{cases} r(i) < \varepsilon_1 \\ \left| \min_k C_k(i) - \min_k C_k(i-1) \right| < \varepsilon_2, \end{cases} \tag{17}$$

where the parameter (i) represents the i-th step iteration in the interior point method. Also, it is assumed that the parameters $\varepsilon_1$ and $\varepsilon_2$ are sufficiently small values. In other words, if any of the conditions specified in conditional clauses: if the barrier parameter becomes smaller than a predefined sufficiently small value and if change in values of the original objective function along with increments of the step iterations is within a predefined sufficiently small value, is satisfied, the step iterations in the interior point method is converged.

Note that the above step iteration convergence conditions in the interior point method are illustrative and any other suitable conditions may be used.

If the interior point method convergence determination unit 23 determines that neither of the above convergence conditions is satisfied, the interior point method convergence determination unit 23 sets the current transmit power level $P_{k,j}$ as an optimum solution at the barrier parameter r(i) and supplies the barrier parameter r(i) together with the objective function F for the interior point method as defined in the formula (13) or the objective function f for the transmit power optimization problem as defined in the formula (14).

Next, exemplary operations of the barrier parameter updating unit 22 are described with reference to FIG. 3. Although second-order derivatives are used herein, higher-order derivatives may be used in other embodiments. The barrier parameter updating unit 22 decreases the barrier parameter r(i) in accordance with a formula as follows, $$r(i+1) = r(i) \times \alpha(i) \tag{18},$$

where the parameter $\alpha$ (i) represents a scale factor of the barrier parameter at the i-th step iteration in the interior point method. Application of logarithms to both sides of the formula (18) leads to $$\log r(i+1) = \log r(i) + \log \alpha(i) \tag{19}.$$

In the present embodiment, since the transmit power optimization problem is solved with use of the interior point method, increments of i may decrease the barrier parameter r(i). Thus, a greater i may lead to a smaller log(r(i)).

Also, letting the objective function including the optimum transmit power level $P_{k,j}$ and the objective function F at the i-th step iteration be F(i) and f(i), respectively, a smaller r(i) may lead to convergence of the optimization problem. Accordingly, influence of the term including the barrier function within the F(i) may become smaller, and the f(i) may become dominant. As the parameter i increases, in other words, as the r(i) and the log(r(i)) decrease, the f(i) approaches the maximum, and accordingly the F(i) also approaches the maximum.

Figure 4A:
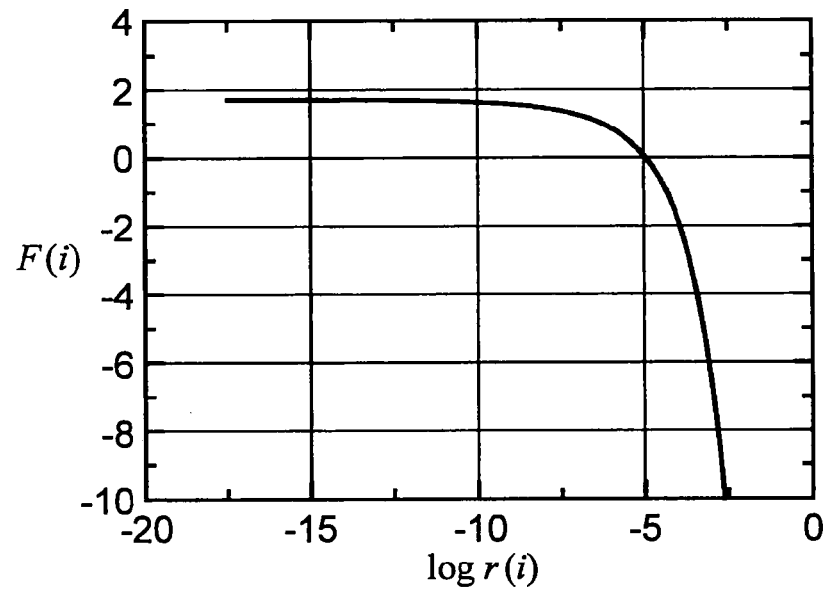
FIGS. 4A and 4B schematically illustrate exemplary relationship between F(i) and log(r(i)) and F' (i) and log(r(i)) according to the first embodiment.

FIG. 4A illustrates an exemplary relationship between the F(i) and the log(r(i)) under the above situation. This relationship may lead to a relationship between a partial derivative F'(i) defined below and the log(r(i)) as illustrated in FIG. 4B, $$F'(i) = \frac{\partial F(i)}{\partial \log r(i)}. \tag{20}$$

Figure 4B:
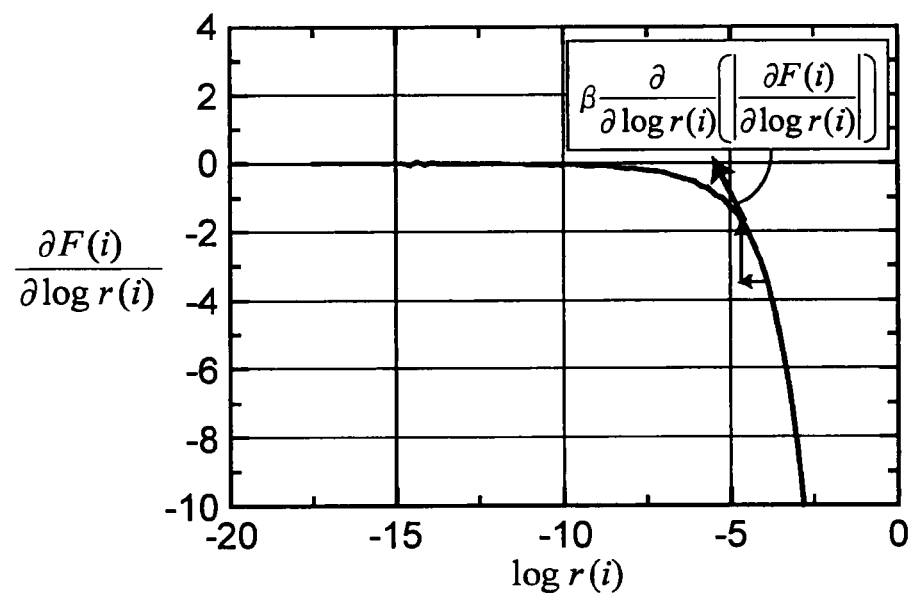

According to the relationship between the parameter i and the log(r(i)) and the illustration in FIG. 4B, the interior point method processing may converge by setting the log(r(i)) to maximize the F' (i). In order to maximize the F' (i), the log(r(i)) may be varied in the directional derivative of the F' (i), that is, based on second-partial derivative of the F(i) with the log(r(i)), as illustrated in FIG. 4B. This can be formulated as follows, $$\log r(i+1) = \log r(i) + \beta \frac{\partial}{\partial \log r(i)} \left( \frac{\partial F(i)}{\partial \log r(i)} \right), \tag{21}$$

where $\beta$ is the scale factor of the directional derivative and an arbitrary positive value.

Since it is hard to solve the formula (20) analytically, it may be approximated as follows, $$\frac{\partial}{\partial \log r(i)} \left( \frac{\partial F(i)}{\partial \log r(i)} \right) \cong \frac{1}{\Delta \log r(i)} \left( \left| \frac{\Delta F(i)}{\Delta \log r(i)} - \frac{\Delta F(i-1)}{\Delta \log r(i-1)} \right| \right), \tag{22}$$

where $$\Delta F(i) = F(i) - F(i-1) \tag{23}$$
$$\Delta \log r(i) = \log r(i) - \log r(i-1).$$

The absolute value in the right-hand side of the formula (22) must be taken such that the second term including $\beta$ in the formula (21) always has a negative value to decrease the log(r(i)).

The higher-order differential value calculation unit 31 calculates a second-order differential value in accordance with the formula (22) and supplies it to the barrier parameter scale factor calculation unit 32. Then, the barrier parameter scale factor calculation unit 32 uses the formula (24) as derived from the formulae (19), (21) and (22) to calculate $\alpha$ (i)

$$\log \alpha(i) = \beta \frac{1}{\Delta \log r(i)} \left( \left| \frac{\Delta F(i)}{\Delta \log r(i)} - \frac{\Delta F(i-1)}{\Delta \log r(i-1)} \right| \right) \tag{24}$$
$$\alpha(i) = e^{\beta \frac{1}{\Delta \log r(i)} \left( \left| \frac{\Delta F(i)}{\Delta \log r(i)} - \frac{\Delta F(i-1)}{\Delta \log r(i-1)} \right| \right)}.$$

The barrier parameter scale factor calculation unit 32 supplies the calculated $\alpha$ (i) to the barrier parameter scale factor multiplication unit 33. In turn, the barrier parameter scale factor multiplication unit 33 calculates a new barrier parameter r(i+1) in accordance with the formula (25) as presented below to update the barrier parameter, $$r(i+1) = r(i) \times e^{\beta \frac{1}{\Delta \log r(i)} \left( \left| \frac{\Delta F(i)}{\Delta \log r(i)} - \frac{\Delta F(i-1)}{\Delta \log r(i-1)} \right| \right)}. \quad (25)$$

The barrier parameter scale factor multiplication unit 33 supplies the new barrier parameter r(i+1) and $P_{k,j}$ to the interior point method processing unit 21, which continues the step iteration in the interior point method. On the other hand, if the interior point method convergence determination unit 23 determines that any of the above convergence conditions is satisfied, the interior point method convergence determination unit 23 supplies the current transmit level $P_{k,j}$ as an optimum solution from the interior point method processing unit 21 to the transmit power control unit 14.

In this embodiment, the barrier parameter updating unit 22 sets the scale factor α (i) of the barrier parameter based on the second-order derivative of the objective function F(i) with respect to the log(r(i)). In other embodiments, the barrier parameter updating unit 22 may set the α (i) based on a higher-order derivative of the objective function f(i) with respect to the log(r(i)).

In this embodiment, the barrier parameter updating unit 22 sets the scale factor α (i) of the barrier parameter based on the second-order derivative of the objective function F(i) with respect to the log(r(i)). In other embodiments, the barrier parameter updating unit 22 may set the α (i) based on a higher-order derivative of a monotonically decreasing function of the barrier function g with respect to the log(r(i)).

Next, an exemplary arrangement of the interior point method processing unit 21 using the steepest descent method in the interior point method processing for optimization is described with reference to FIG. 5. As illustrated in FIG. 5, the interior point method processing unit 21 includes an initial power calculation unit 51, a barrier parameter multiplication unit 52, a channel capacity calculation unit 53, a steepest descent processing unit 54 and an iteration unit 55.

Figure 6:
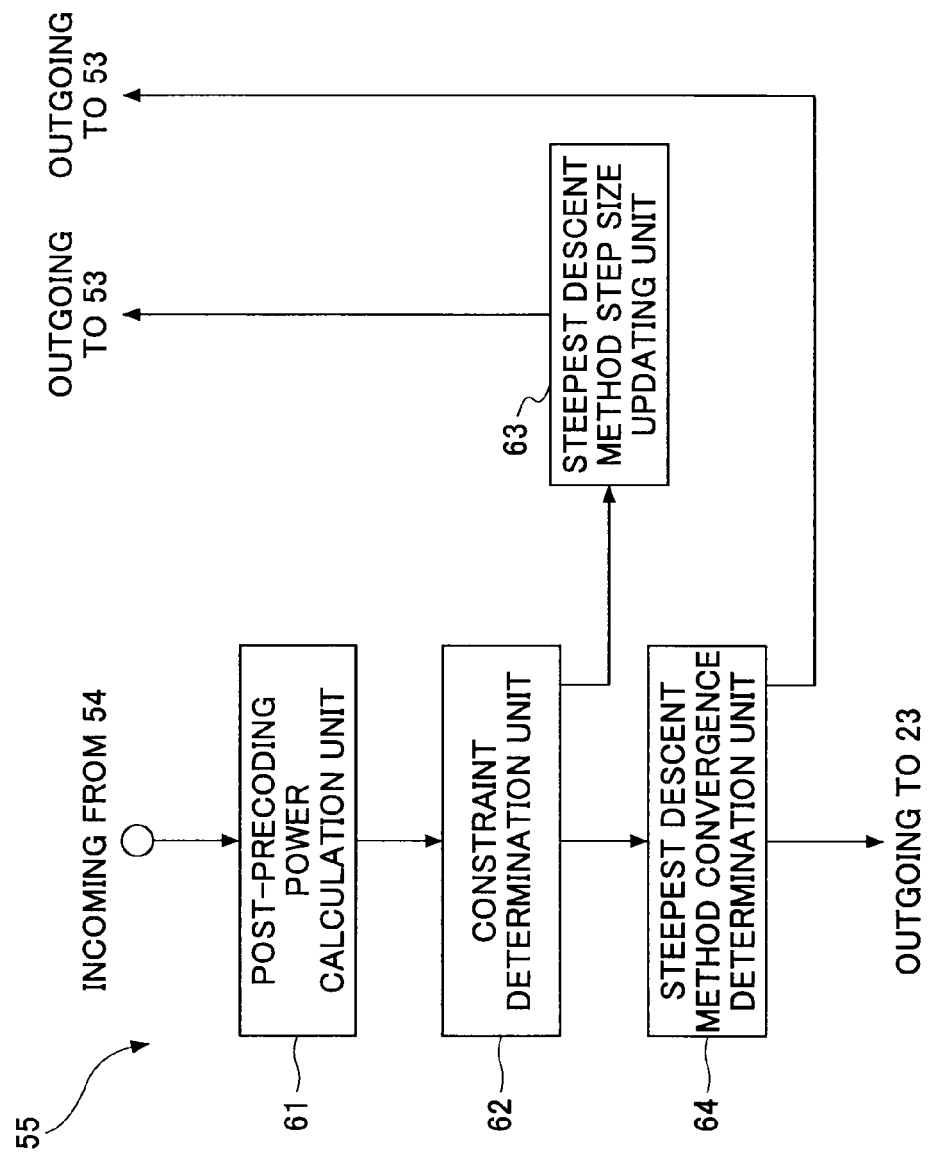
FIG. 6 illustrates an iteration unit in the interior point method processing unit in the optimum transmit power calculation unit in the radio communication apparatus according to the first embodiment.

Next, an exemplary arrangement of the iteration unit 55 is described with reference to FIG. 6. The iteration unit 55 includes a post-precoding power calculation unit 61, a constraint determination unit 62, a steepest descent method step size updating unit 63 and a steepest descent method convergence determination unit 64.

Exemplary specific operations of the optimization with use of the steepest descent method in the interior point method are described below. The $w_{k,q,j}$ and $\lambda_{k,j}$ incoming to the interior point method processing unit 21 are supplied to the initial power calculation unit 51. The initial power calculation unit 51 uses an initial value of the $P_{k,j}$ as well as the supplied $w_{k,q,j}$ and $\lambda_{k,j}$ to calculate transmit power levels $P_q$ for individual transmit antennas. Using the left-hand side of the formula (11), the transmit power level $P_q$ is represented as follows, $$P_q = \sum_{k=1}^{N} \sum_{j=1}^{M_r} |w_{k,j,q}|^2 P_{k,j}. \quad (26)$$

The initial power calculation unit 51 supplies the $P_q$ to the barrier parameter multiplication unit 52. The barrier parameter multiplication unit 52 multiplies the barrier parameter r(i) with the barrier function.

Then, the channel capacity calculation unit 53 uses the supplied $w_{k,q,j}$ and $\lambda_{k,j}$ as well as the $P_{k,j}$ to calculate respective channel capacities for individual users in accordance with the formula (9) and supplies them to the steepest descent processing unit 54. The steepest descent processing unit 54 optimizes the formula (13) associated with the optimization problem using the barrier function in accordance with the steepest descent method. The steepest descent method is a scheme for optimization using gradient information in the formula (13), and iterative operations as specified below are conducted, $$P_{k,j}(u+1) = P_{k,j}(u) + \gamma \times \frac{\partial}{\partial P_{k,j}} F, \quad (27)$$

where the parameter u represents the u-th iteration, and γ represents a step size.

The transmit power level $P_{k,j}$ optimized in the steepest descent processing unit 54 is supplied to the iteration unit 55. In response to receipt of the transmit power level $P_{k,j}$, the post-precoding power calculation unit 61 in the iteration unit 55 calculates transmit power levels $P_q$ for individual transmit antennas based on the supplied $P_{k,j}$ and $w_{k,q,j}$ and supplies the $P_q$ to the constraint determination unit 62. The constraint determination unit 62 determines whether conditions as presented below are satisfied, $$\begin{cases} P_q \leq P_{max,q} \\ P_{k,j} \geq 0. \end{cases} \quad (28)$$

If any of the conditions in the formula (28) is not satisfied, the steepest descent method step size updating unit 63 decreases the step size γ and supplies it to the channel capacity calculation unit 53. Using the $P_{k,j}$ associated with the previous operation of the formula (27), the constraint determination unit 62 iterates the above operation until the constraints as specified in the formula (28) are satisfied. If the constraint is satisfied, the constraint determination unit 62 supplies the transmit power level $P_{k,j}$ to the steepest descent method convergence determination unit 64. In turn, the steepest descent method convergence determination unit 64 determines whether convergence conditions for the steepest descent method as presented below are satisfied, $$\begin{cases} \left\| \frac{\partial}{\partial P_{k,j}} F(u) \right\| = \left( \sum_{k=1}^{N} \sum_{j=1}^{M_r} \left| \frac{\partial}{\partial P_{k,j}} F(u) \right|^2 \right)^{1/2} < \varepsilon_3 \\ \left| \min_k C_k(u) - \min_k C_k(u-1) \right| < \varepsilon_4 \\ u > I_{max}, \end{cases} \quad (29)$$

where the parameter u represents the number of iterations in the steepest descent method, the parameter $I_{max}$ is defined as the maximum number of iterations. Also, the parameters $\varepsilon_3$ and $\varepsilon_4$ are sufficiently small values. In other words, any of conditions specified in conditional clauses: if change in an objective function corresponding to change in transmit power is within a predefined sufficiently small value, if change in an original objective function corresponding to increments in iterations is within a predefined sufficiently small value, and if the number of iterations exceeds a predefined threshold, is satisfied, the iteration of steps in the steepest descent method is converged.

Note that the above convergence conditions for the steepest descent method are illustrative and other convergence conditions may be used.

If the steepest descent method convergence determination unit 64 determines that none of the conditions in the formulae (29) is satisfied, the steepest descent method convergence determination unit 64 supplies the current transmit power value $P_{k,j}$ to the channel capacity calculation unit 53 for an additional iteration. The above operations are iterated until the steepest descent method convergence determination unit 64 determines that any of the conditions in the formula (29) is satisfied. On the other hand, if the steepest descent method convergence determination unit 64 determines that any of the conditions is satisfied, the steepest descent method convergence determination unit 64 supplies the transmit power value $P_{k,j}$ to the interior point method convergence determination unit 23.

Figure 7:
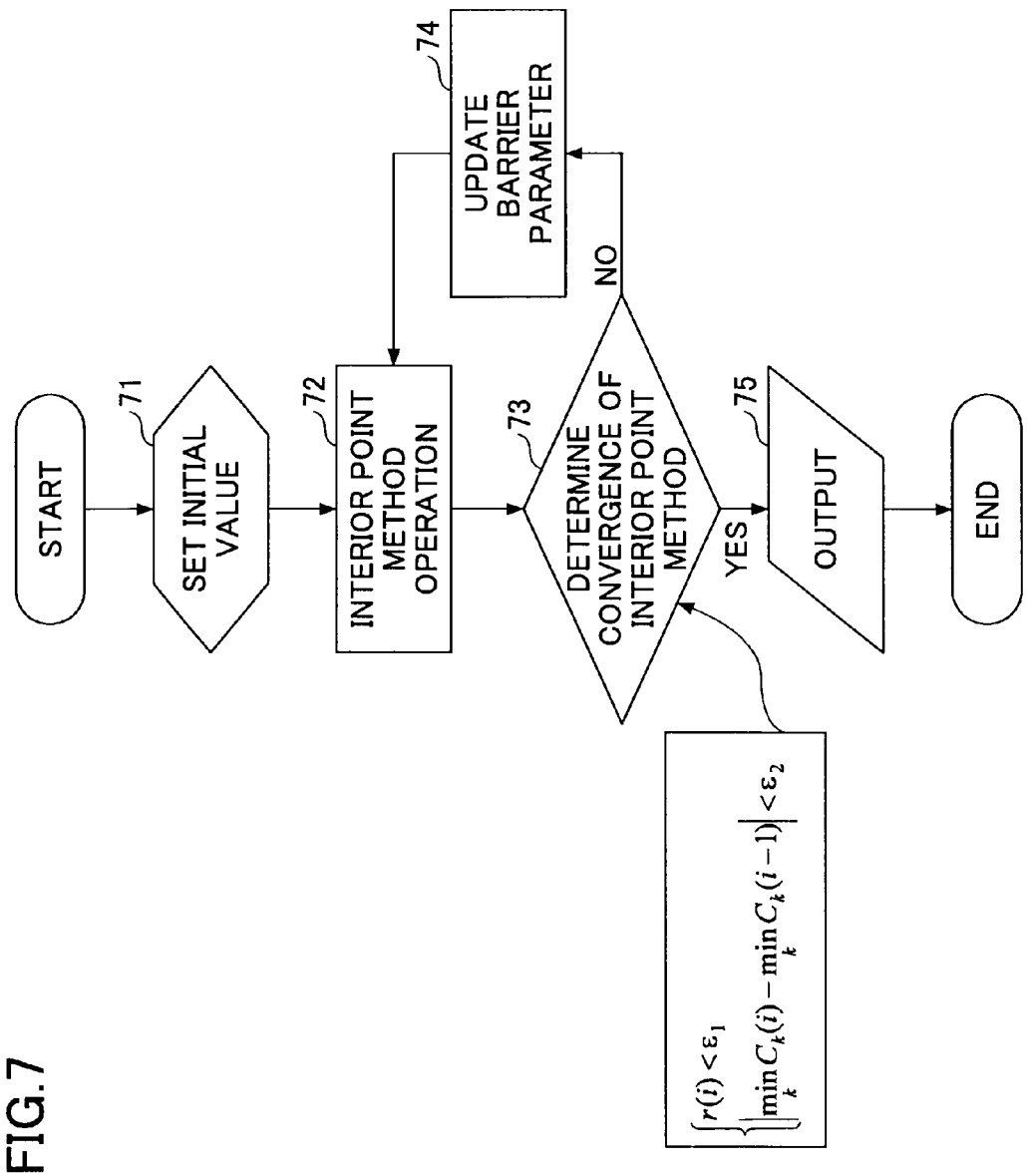
FIG. 7 is a flowchart of operations of the optimum transmit power calculation unit in the radio communication apparatus according to the first embodiment.

Exemplary operations of the optimum transmit power calculation unit 13 are described with reference to the flowchart in FIG. 7. In the optimum transmit power calculation unit 13, at step 71, the barrier parameter r(i), the initial transmit power level $P_{k,j}$, the maximum number of iterations in the steepest descent method $I_{max}$ and the parameters $\epsilon_1$ through $\epsilon_4$ are specified. At step 72, after the interior point method processing and then the transmit power optimization at the i-th step iteration in the interior point method are carried out, the transmit power level $P_{k,j}$, the barrier parameter r(i) and the objective function F associated with the interior point method or the original objective function f associated with the transmit power optimization problem in the formula (13) are supplied to step 73. In this embodiment, the initial values used for the steepest descent method and the interior point method are set at step 71. In other embodiments, some parameters may be preferably set depending on the applied optimization scheme and convergence conditions.

At step 73, it is determined whether the convergence conditions in the interior point method as specified in the formula (17) are satisfied. If neither of the convergence conditions in the formula (17) is satisfied, the current transmit power $P_{k,j}$ is determined as an optimum solution at the barrier parameter r(i), and the monotonically decreasing function of r(i) and F(i), f(i) or g(i) is supplied to step 74.

Figure 8:
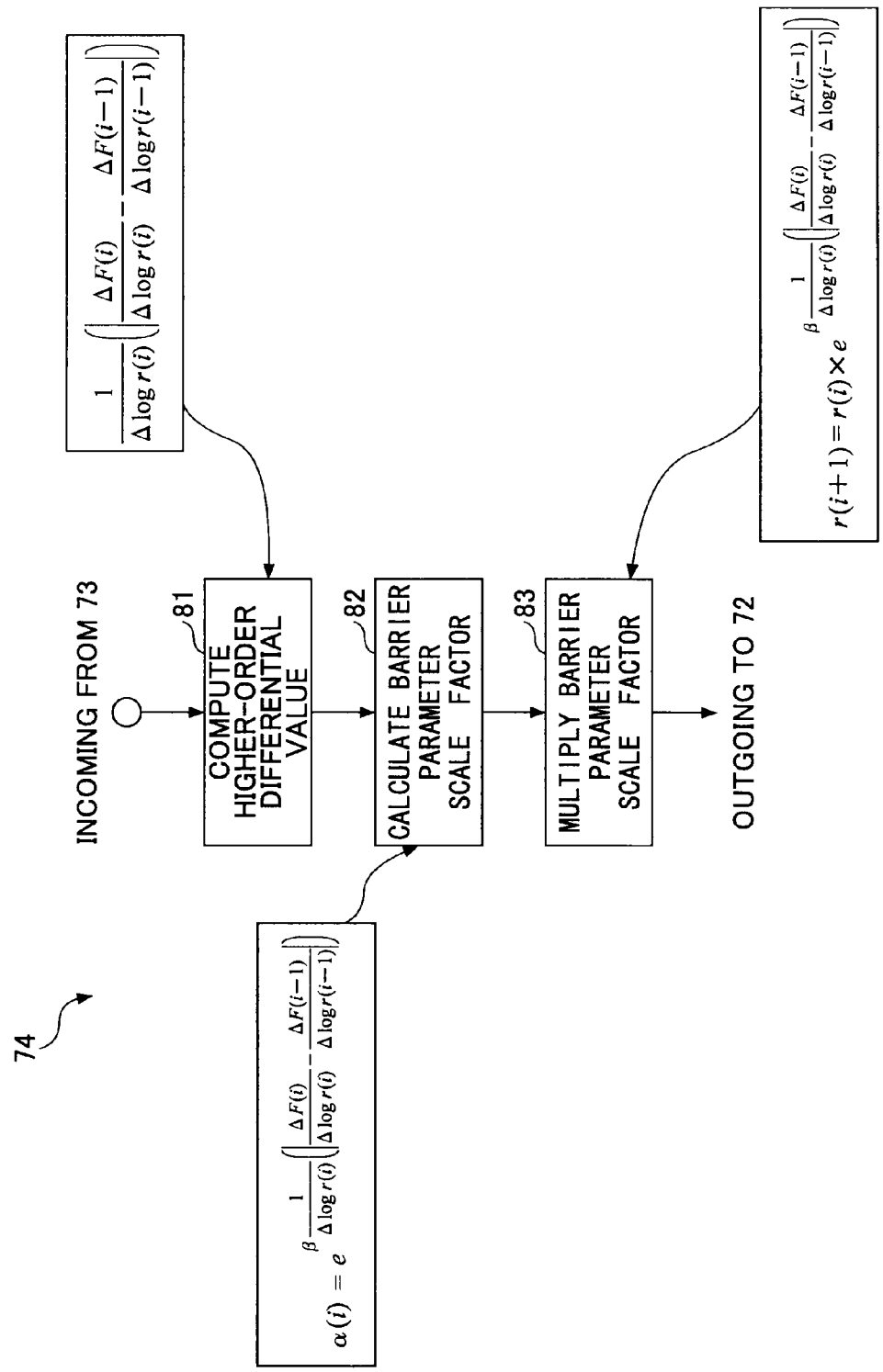
FIG. 8 is a flowchart of operations of the barrier parameter updating unit in the optimum transmit power calculation unit in the radio communication apparatus according to the first embodiment.

Next exemplary detailed operations of step 74 are described with reference to the flowchart in FIG. 8. At step 81, the monotonically decreasing function of the r(i) and F(i), f(i) or g(i) supplied to step 74 is used to calculate a high-order differential value in accordance with the formula (22), and the calculated high-order differential value is supplied to step 82. At step 82, the α (i) is derived in accordance with the formula (24) and delivered to step 83. At step 83, the derived α (i) is used to calculate a new barrier parameter, and the $P_{k,j}$ and r(i+1) are supplied to step 72 for an additional step iteration in the interior point method. On the other hand, if any of the convergence conditions in the formula (17) is satisfied, the current transmit power level $P_{k,j}$ is supplied as an optimum solution to step 75.

Figure 9:
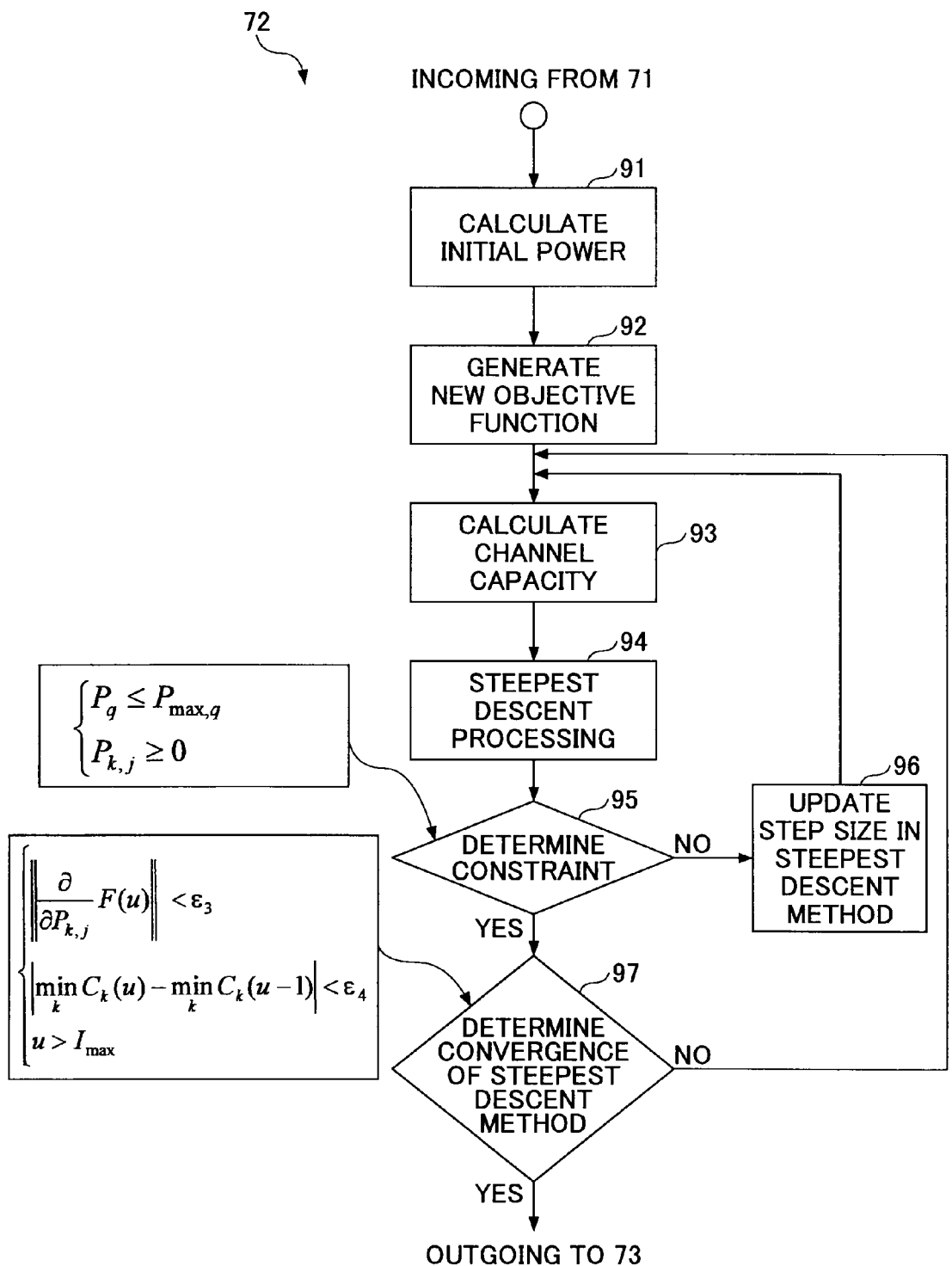
FIG. 9 is a flowchart of operations of the interior point method processing unit in the optimum transmit power calculation unit in the radio communication apparatus according to the first embodiment.

Next, exemplary detailed operations of the optimization using the steepest descent method at step 72 are described with reference to the flowchart in FIG. 9. At step 91, transmit power levels $P_q$ are calculated for individual transmit antennas as stated above and supplied to step 92. At step 92, multiplication with the barrier parameter r(i) is performed to generate the objective function F for the new optimization problem, and it is supplied together with the $P_q$ to step 93. At step 93, respective channel capacities are calculated for individual users. At step 94, a gradient of the objective function F, that is, a differential value of the objective function F, is calculated based on the channel capacities. Then, a new $P_{k,j}$ is calculated based on the gradient in accordance with the formula (27) and supplied to step 95. At step 95, after the calculation of the transmit power levels for the individual transmit antennas in accordance with the formula (26), it is determined whether the constraint as specified in the formula (28) is satisfied. If any of the conditions is not satisfied, at step 96, the step size γ is decreased and supplied to step 93 for an additional iteration. The above operations are iterated until the constraint is satisfied. On the other hand, if all of the conditions as specified in the formula (28) are satisfied at step 95, it is determined whether the convergence conditions in the steepest descent method as specified in the formula (29) are satisfied at step 97. If none of the convergence conditions in the formula (29) is satisfied, the transmit power level $P_{k,j}$ is supplied to step 93 for an additional iteration. The above operations are iterated until any of the convergence conditions in the formula (29) is satisfied. On the other hand, if any of the convergence conditions is satisfied, the current transmit power level $P_{k,j}$ is supplied as an optimum solution for the steepest descent method to step 73.

In this embodiment, the optimization scheme using the steepest descent method in the interior point method processing is used. In other embodiments, other suitable optimization schemes may be used for the interior point method processing. Even in this case, a high-order differential value for a monotonically decreasing function of the objective function F including the barrier function or the original objective function f with the logarithm value log(r(i)) of the barrier parameter r(i), such as –g, 1/g, (r*g) or (–1/(r*g)), can be used to adaptively update the barrier parameter suitable for the steps in the interior point method.

In the above optimization scheme, the optimization problem is solved such that channel capacities $C_k$ are made uniform for individual users. In other embodiments, the optimization problem may be solved such that channel capacity C for the overall system is maximized. In this case, the optimization problem is reformulated below, $$\text{maximize } C = \sum_{k=1}^{N} \sum_{j=1}^{M_r} \log_2(1 + SNR_{k,j}) \quad (30)$$

$$\text{s.t. } \sum_{k=1}^{N} \sum_{j=1}^{M_r} |w_{k,q,j}|^2 P_{k,j} \leq P_{max,q} \quad (31)$$

$$P_{k,j} \geq 0 \,\forall\, k, j. \quad (32)$$

The optimization problem directed to maximize the channel capacity C for the overall system is referred to as Sum-rate criteria herein. The solution for that optimization problem is similar to Fairness criteria.

Figure 10:
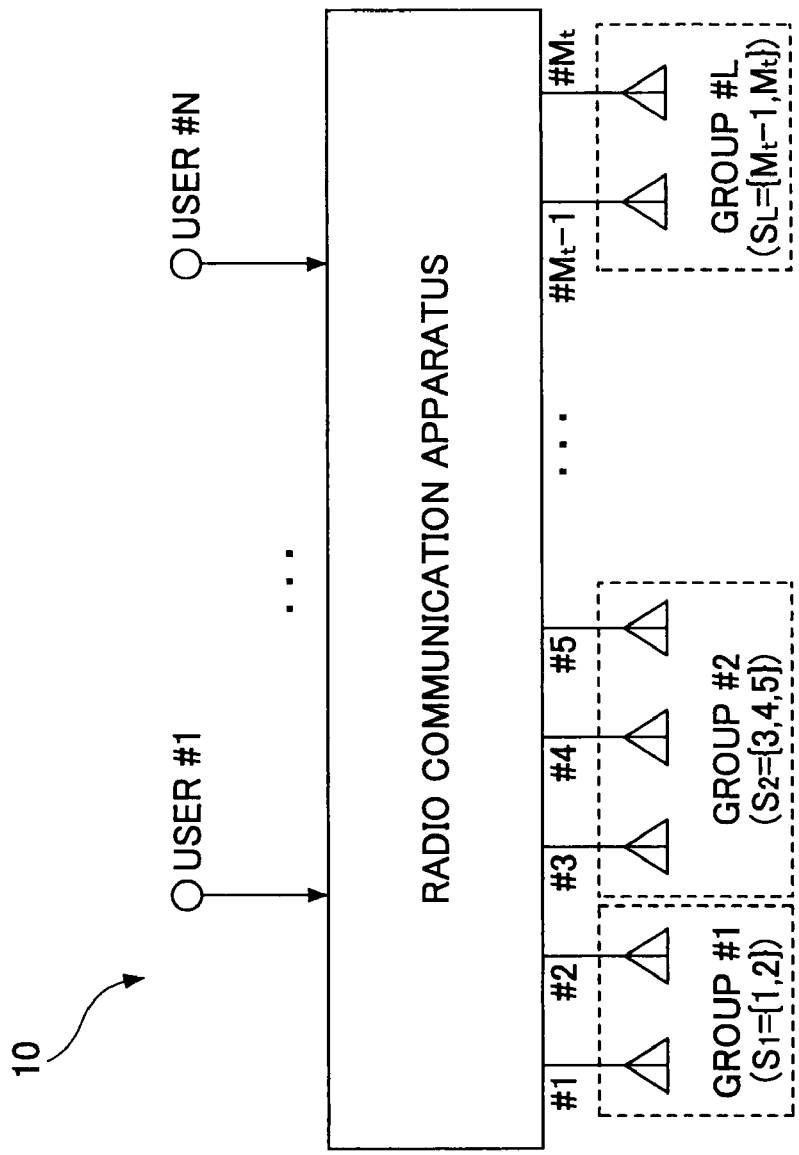
FIG. 10 schematically illustrates exemplary grouping of multiple transmit antennas in the radio communication apparatus according to the first embodiment.

In the above-mentioned embodiments, the power limit values $P_{max,q}$ are illustratively provided for individual transmit antennas. In other embodiments, transmit antennas may be grouped into several groups, and the power limit values may be provided for the several groups. FIG. 10 illustrates exemplary groups of transmit antennas in a radio communication apparatus. In the illustration, the reference symbol L ($1 \leq l \leq L$) represents the group number, and the reference symbol $S_l$ represents a set of transmit antenna numbers belonging to the group l. An optimization problem in accordance with the Fairness criteria for this embodiment is formulated, $$\text{maximize} \min_k C_k = \min_k \sum_{j=1}^{M_r} \log_2(1 + SNR_{k,j}) \quad (33)$$

$$\text{s.t.} \sum_{q \in S_l} \left[ \sum_{k=1}^{N} \sum_{j=1}^{M_r} |w_{k,q,j}|^2 P_{k,j} \right] \leq P_{max,l} \quad (34)$$

$$P_{k,j} \geq 0 \,\forall\, k, j, \quad (35)$$

where the power limit value notation for group 1 is $P_{max,1}$. This optimization problem can be solved similar to the above-mentioned solution. Also, the optimization problem in accordance with the Sum-rate criteria can be also solved similarly.

In the above-mentioned embodiments, the BD-ZF scheme is illustratively applied for precoding, but the present embodiment can be applied to transmit power optimization problems through use of other precoding schemes.

Second Embodiment

In the first embodiment, it is assumed that multiple transmit antennas are installed on a radio communication apparatus. In the second embodiment, multiple transmit antennas may be separated from a radio communication apparatus and be coupled to the radio communication apparatus in a wired and/or wireless manner.

Figure 11:
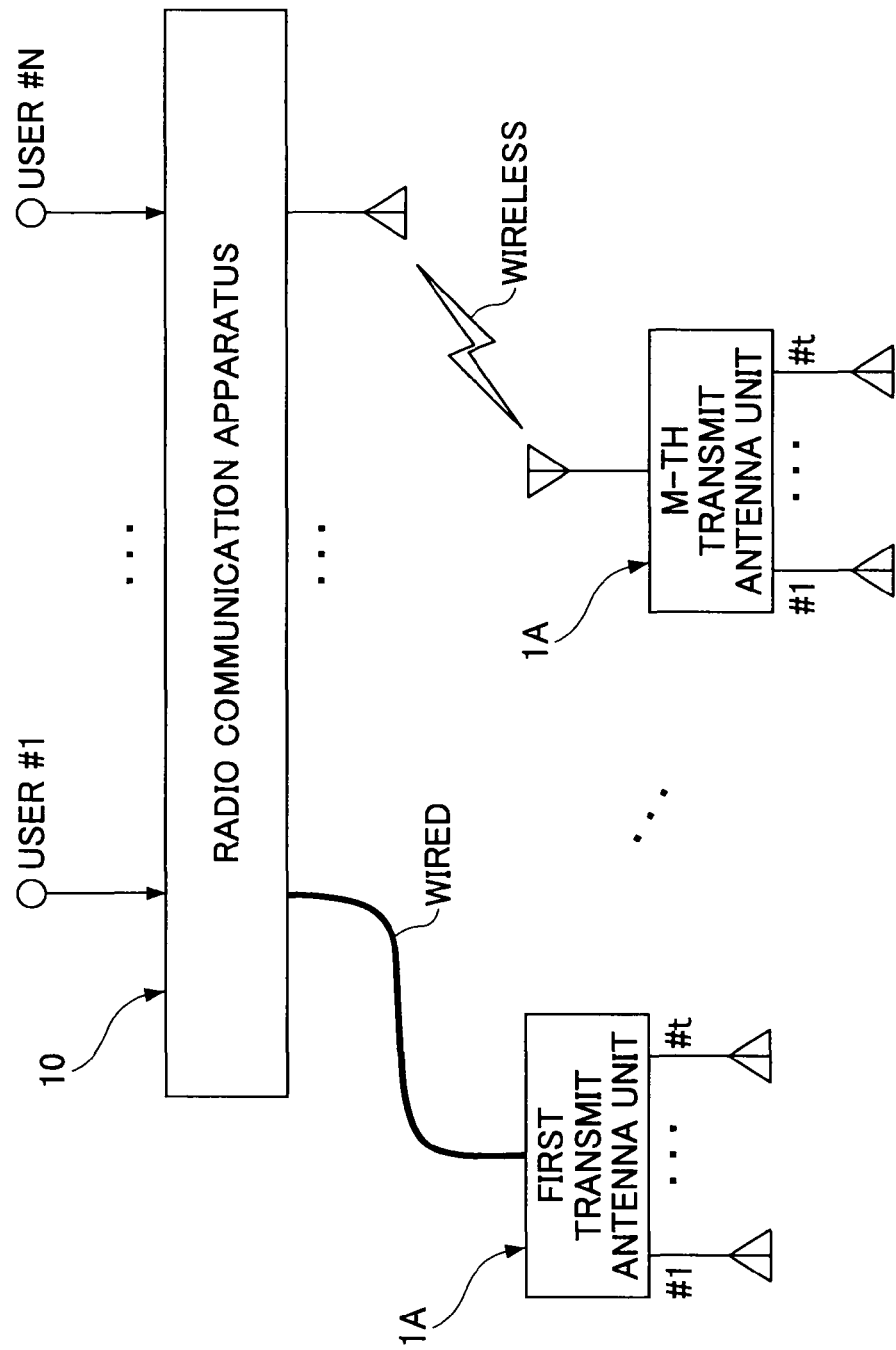
FIG. 11 schematically illustrates an exemplary arrangement of a radio communication apparatus according to a second embodiment.

FIG. 11 illustrates a radio communication apparatus according to the second embodiment of the present invention. A radio communication apparatus is coupled to transmit antenna units 1As each having multiple transmit antennas in a wired and/or wireless manner.

In operation, the radio communication apparatus 10 may operate in a similar manner to that of the first embodiment except that the radio communication apparatus 10 is separated from the transmit antenna units 1As.

[Application Instance]

An exemplary application instance for the first embodiment as mentioned above is described below. In order to validate the effectiveness of the present embodiment, some computer simulation results are illustrated for the first embodiment where the BD-ZF is applied for precoding and uniform power limit values $P_{max}$ are set for individual transmit antennas. Also, the barrier function as specified in the formula (15) is used for this simulation. Further, it is assumed that the number $M_t$ of transmit antennas is equal to 6, the number N of users is equal to 2, the number $M_r$ of user antennas is equal to 3, and three streams are space-multiplexed and transmitted for each user. Also, it is assumed that the power limit value $P_{max}$ is equal to ⅙ for each transmit antenna, and the total usable transmit power is equal to 1. For the propagation environment, it is assumed that respective MIMO channels for the users are independent identically distributed (i.i.d.) Rayleigh fading. Other parameters are set below. Note that the parameter $\epsilon_2$ is set to 0 to observe convergence in the present simulation.

[Parameters in the Case Where the α (i) in the Formula (18) is Fixed]

$P_{k,j}(0)=10^{-10}$, $r(0)=1.0$, α (i)=0.05, $I_{max}=2000$, $\epsilon_1=10^{-3}$, $\epsilon_3=10^{-6}$, and $\epsilon_4=10^{-11}$

[Parameters According to the First Embodiment]

$P_{k,j}(0)=10^{-10}$, $r(0)=100.0$, β=0.1, $I_{max}=2000$, $\epsilon_1=10^{-3}$, $\epsilon_3=10^{-6}$, and $\epsilon_4=10^{-11}$ In the optimization according to the first embodiment, respective values of the objective function and the barrier parameter in the (i−1)-th and (i−2)-th step iterations are required to set the α (i). Thus, there is a likelihood that the α (i) may depend on the initial transmit power level $P_{k,j}$ for a small i. For this reason, the α (i) is set to 0.05 for i<3. Also, in this application instance, the first embodiment is applied for i=3, 5, 7, 9, and so on whereas α (3), α (5), α (7), α (9) and so on are used for i=4, 6, 8, 10 and so on.

Figure 12:
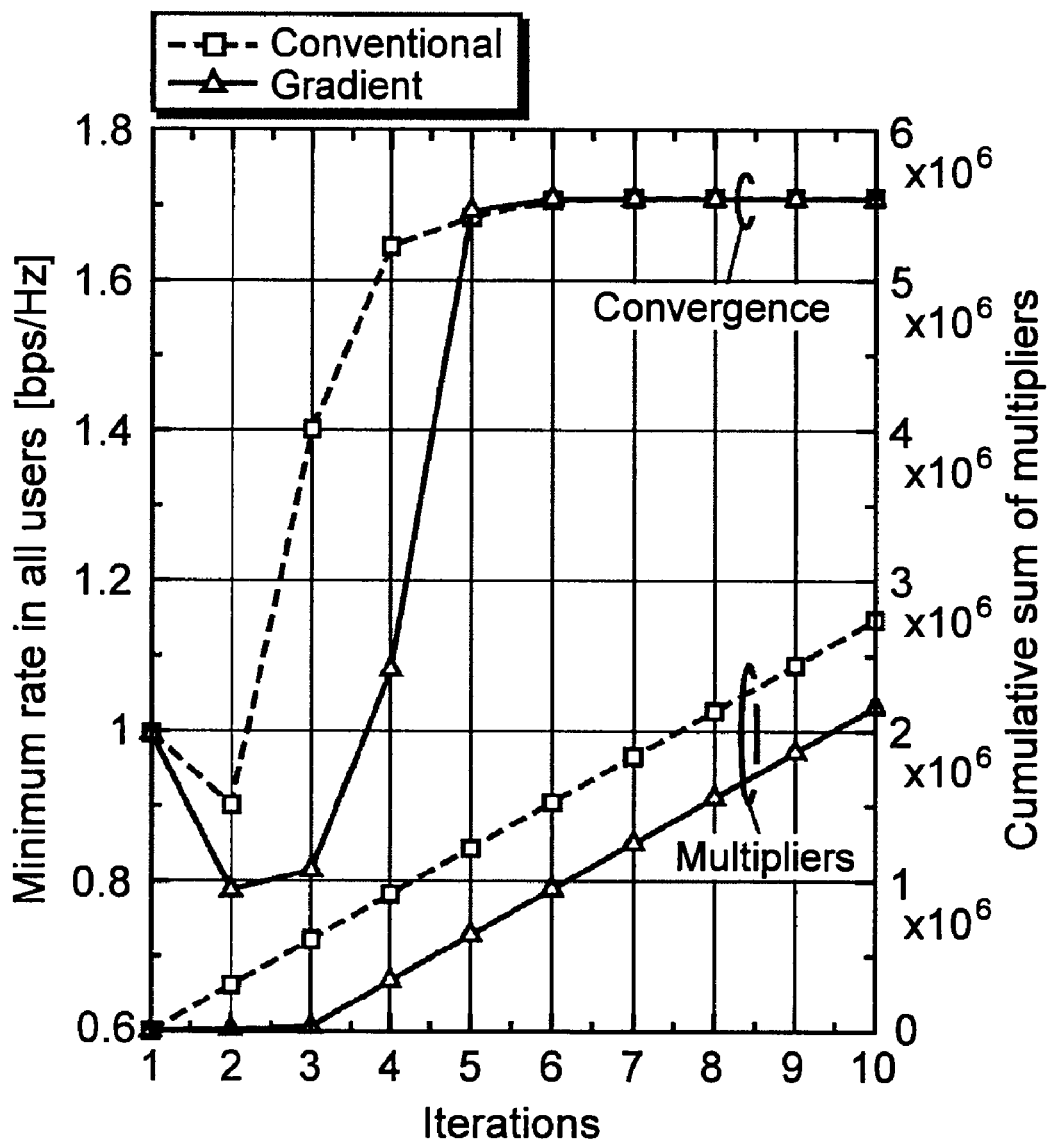
FIG. 12 illustrates convergence performances and computational complexity associated with the convergence in accordance with Fairness criteria according to the present invention.

FIG. 12 illustrates exemplary results of performances of convergence and the number of multiplications for the optimization with the fixed α (i) in the formula (18) and the optimization according to the first embodiment. In the illustration, the "Conventional" illustrates the performances of the optimization with the fixed a (i), and the "Gradient" illustrates the performances of the optimization according to the first embodiment. Also, the "Convergence" illustrates minimum user channel capacity at step i in the interior point method on the left-hand side of the vertical axis. On the other hand, the "Multipliers" illustrates the number of accumulated multiplications on the right-hand side of the vertical axis. Note that the horizontal axis represents the i-th step iteration in the interior point method.

From the illustration in FIG. 12, it can be observed that if the convergence value is set to about 1.71, the "Conventional" requires 6 iterations and $1.52 \times 10^6$ multiplications for convergence. On the other hand, it can be observed that in that case, the "Gradient" according to the first embodiment requires 6 iterations and $0.95 \times 10^6$ multiplications for convergence, resulting in reduction in multiplications by about 38%.

Figure 13:
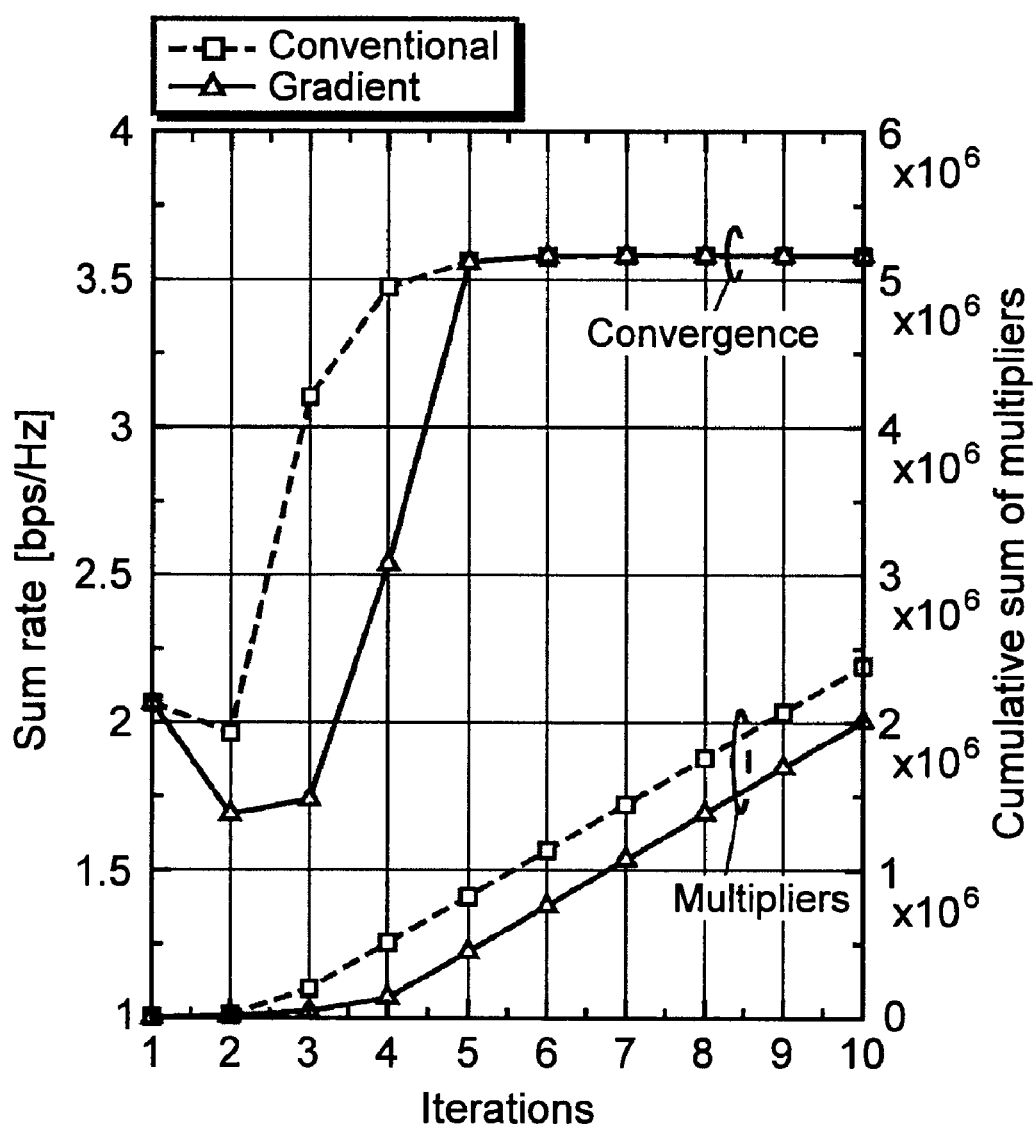
FIG. 13 illustrates convergence performances and computational complexity associated with the convergence in accordance with Sum-rate criteria according to the present invention.

FIG. 13 illustrates exemplary results of performances of convergence and the number of multiplications for the optimization with the fixed α (i) in the formula (18) and the optimization according to the first embodiment in accordance with the Sum-rate criteria. In the illustration, the "Conventional" illustrates the performances of the optimization with the fixed α (i), and the "Gradient" illustrates the performances of the optimization according to the first embodiment. Also, the "Convergence" illustrates overall system channel capacity at step i in the interior point method on the left-hand side of the vertical axis. On the other hand, the "Multipliers" illustrates the number of accumulated multiplications on the right-hand side of the vertical axis. Note that the horizontal axis represents the i-th step iteration in the interior point method.

From the illustration in FIG. 13, it can be observed that if the convergence value is set to about 3.58, the "Conventional" requires 6 iterations and $1.13 \times 10^6$ multiplications for convergence. On the other hand, it can be observed that in that case, the "Gradient" according to the first embodiment requires 6 iterations and $0.76 \times 10^6$ multiplications for convergence, resulting in reduction in multiplications by about 33%.

For convenience, the present invention has been described with reference to the distinct embodiments, but separation of the embodiments is not essential to the present invention and two or more of the embodiments may be used together as needed. Some specific numerals have been used to facilitate understanding of the present invention, but unless otherwise noted, these numerals are simply illustrative and any other appropriate values may be used.

The present invention has been described with reference to the specific embodiments of the present invention, but the embodiments are simply illustrative and variations, modifications, alterations and substitutions could be contrived by those skilled in the art. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This application is based upon and claims the benefit of priority of the prior Japanese Patent Application No. 2008-125341, filed on May 12, 2008, the entire contents of which are incorporated herein by reference.

What is claimed is:

1. A radio communication apparatus for transmitting a radio signal to multiple users via multiple transmit antenna groups at appropriate transmit power levels, each of the transmit antenna groups including one or more transmit antennas, the transmit antenna groups having respective transmit power constraints, the apparatus comprising: a precoding unit configured to perform precoding on signals modulated for individual users and generate transmit weight related information; an optimum transmit power calculation unit configured to receive the transmit weight related information from the precoding unit and calculate a transmit power level to optimize an objective function in accordance with an interior point method, the objective function resulting from addition of a barrier function adjusted with a barrier parameter to an original objective function associated with a constrained optimization problem; and a transmission unit configured to transmit a radio signal at the calculated transmit power level, wherein the original objective function comprises a function of respective channel capacities for individual users derived from the transmit weight related information, and wherein the optimum transmit power calculation unit is configured to adaptively update a logarithm of the barrier parameter and use a gradient obtained through a high-order differential with the logarithm of the barrier parameter to calculate the transmit power level to optimize the resulting objective function.

2. The radio communication apparatus as claimed in claim 1, wherein the optimum transmit power calculation unit is configured to use a high-order differential value of the resulting objective function with the logarithm of the barrier parameter as the gradient.

3. The radio communication apparatus as claimed in claim 1, wherein the optimum transmit power calculation unit is configured to use a high-order differential value of the original objective function with the logarithm of the barrier parameter.

4. The radio communication apparatus as claimed in claim 1, wherein the optimum transmit power calculation unit is configured to use a high-order differential value of a monotonically decreasing function of the barrier function with the logarithm of the barrier parameter.

5. The radio communication apparatus as claimed in claim 1, wherein the optimum transmit power calculation unit is configured to use a second-order differential as the high-order differential.

6. The radio communication apparatus as claimed in claim 1, wherein the optimum transmit power calculation unit is configured to use a steepest descent method in the interior point method for constrained optimization.

7. The radio communication apparatus as claimed in claim 6, wherein the optimum transmit power calculation unit is configured to terminate step iteration in the steepest descent method if any of conditions is satisfied, and
the conditions include a condition of change in values of the resulting objective function derived in accordance with the interior point method with respect to change in transmit power levels being within a predefined threshold, a condition of change in values of the original objective function with respect to an increment of the step iteration being within a predefined threshold, and a condition of the number of step iterations exceeding a predefined threshold.

8. The radio communication apparatus as claimed in claim 1, wherein
the optimum transmit power calculation unit is configured to terminate step iteration in the interior point method if any of conditions is satisfied, and
the conditions include a condition of the barrier parameter being smaller than a predefined threshold, and a condition of change in values of an original objective function with respect to an increment of the step iteration being within a predefined threshold.

9. The radio communication apparatus as claimed in claim 1, wherein the optimum transmit power calculation unit is configured to perform the constrained optimization to make respective channel capacities for the users uniform.

10. The radio communication apparatus as claimed in claim 1, wherein the optimum transmit power calculation unit is configured to perform the constrained optimization to maximize channel capacity for an overall system.

11. A radio communication method for transmitting a radio signal to multiple users via multiple transmit antenna groups at appropriate transmit power levels, each of the transmit antenna groups including one or more transmit antennas, the transmit antenna groups having respective transmit power constraints, the method comprising: precoding signals modulated for individual users and generating transmit weight related information; receiving the transmit weight related information from the precoding unit and calculating a transmit power level to optimize an objective function in accordance with an interior point method, the objective function resulting from addition of a barrier function adjusted with a barrier parameter to an original objective function associated with a constrained optimization problem; and transmitting a radio signal at the calculated transmit power level, wherein the original objective function comprises a function of respective channel capacities for individual users derived from the transmit weight related information, and wherein the calculating comprises adaptively updating a logarithm of the barrier parameter and using a gradient obtained through high-order differential with the logarithm of the barrier parameter to calculate the transmit power level to optimize the resulting objective function.

12. The radio communication method as claimed in claim 11, wherein the calculating comprises using a high-order differential value of the resulting objective function with the logarithm of the barrier parameter as the gradient.

13. The radio communication method as claimed in claim 11, wherein the calculating comprises using a high-order differential value of the original objective function with the logarithm of the barrier parameter.

14. The radio communication method as claimed in claim 11, wherein the calculating comprises using a high-order differential value of a monotonically decreasing function of the barrier function with the logarithm of the barrier parameter.

15. The radio communication method as claimed in claim 11, wherein the calculating comprises using a second-order differential as the high-order differential.

16. The radio communication method as claimed in claim 11, wherein the calculating comprises using a steepest descent method in the interior point method for constrained optimization.

17. The radio communication method as claimed in claim 16, wherein the calculating comprises terminating step iteration in the steepest descent method if any of conditions is satisfied, and the conditions include a condition of change in values of the resulting objective function derived in accordance with the interior point method with respect to change in transmit power levels being within a predefined threshold, a condition of change in values of the original objective function with respect to an increment of the step iteration being within a predefined threshold, and a condition of the number of step iterations exceeding a predefined threshold.

18. The radio communication method as claimed in claim 11, wherein the calculating comprises terminating step iteration in the interior point method if any of conditions is satisfied, and the conditions include a condition of the barrier parameter being smaller than a predefined threshold, and a condition of change in values of an original objective function with respect to an increment of the step iteration being within a predefined threshold.

19. The radio communication method as claimed in claim 11, wherein the calculating comprises performing the constrained optimization to make respective channel capacities for the users uniform.

20. The radio communication method as claimed in claim 11, wherein the calculating comprises performing the constrained optimization to maximize channel capacity for an overall system.

* * * * *